United States Patent [19]

Ho

[11] Patent Number: 5,619,708
[45] Date of Patent: Apr. 8, 1997

[54] SYSTEM AND METHOD FOR GENERATING DATABASE INPUT FORMS

[75] Inventor: Janet C. Ho, Milpitas, Calif.

[73] Assignee: Korteam International, Inc., Sunnyvale, Calif.

[21] Appl. No.: 328,362

[22] Filed: Oct. 25, 1994

[51] Int. Cl.$^6$ .......................... G06F 15/00; H04N 1/387; H04N 1/46

[52] U.S. Cl. .......................... 395/767; 358/453; 358/538

[58] Field of Search .................................... 395/149, 144, 395/148, 155, 156, 157; 358/403, 452, 453, 537, 538, 539; 382/164, 165

[56] References Cited

U.S. PATENT DOCUMENTS

| | | | |
|---|---|---|---|
| 5,060,980 | 10/1991 | Johnson et al. | 283/70 |
| 5,129,053 | 7/1992 | Makihara | 395/149 |
| 5,181,162 | 1/1993 | Smith et al. | 364/419.19 |
| 5,208,907 | 5/1993 | Shelton et al. | 395/149 |
| 5,231,670 | 7/1993 | Goldhor et al. | 381/43 |
| 5,235,654 | 8/1993 | Anderson et al. | 382/180 |
| 5,237,628 | 8/1993 | Levitan | 382/175 |
| 5,319,745 | 6/1994 | Vinsonneau et al. | 395/144 |
| 5,414,809 | 5/1995 | Hogan et al. | 395/155 |
| 5,495,565 | 2/1996 | Millard et al. | 395/147 |

OTHER PUBLICATIONS

"Borland Releases dBASE 5.0: Long–Awaited Version Offers Object–Oriented DOS Tools," LAN Times, p. 39, vol. 11, Sep. 5, 1994.

Borland dBASE for Windows 5.0 (User's Guide), Borland International Inc., 1994.

*Primary Examiner*—Heather R. Herndon
*Assistant Examiner*—Joseph R. Burwell
*Attorney, Agent, or Firm*—Gary S. Williams; Flehr, Hohbach, Test, Albritton & Herbert

[57] ABSTRACT

A system for generating voice activated computer data entry forms includes a scanner to scan an existing data entry form and to generate a digitized representation of the data entry form. Stored in the system's computer memory is a database for storing information, a voice dictionary and voice syntax files representing voice recognition information. A set of form definition procedures include an imaging procedure for displaying the scanned data entry form on the display and a region definition procedure for enabling a user to indicate regions of the displayed data entry form. Object definition procedures enable a user to define a multiplicity of objects, including form sections, text boxes, and checkbox buttons, and for specifying properties of the defined objects. The object properties that can be specified include (A) database links for linking selected objects to respective specified fields in the database, (B) exclusionary relationships for specifying which objects cannot be selected by end users when other specified objects have previously been selected, and (C) voiced command data specifying voiced commands to use for end user voiced selection of said objects. The object definition procedures store, in a form definition data structure in the computer system's memory, form definition data corresponding to the user defined objects and user specified object properties. The scanned form can be color coded to indicate different objects in the form and color information in the form's digitized representation is automatically decoded to generate object and object property definitions.

12 Claims, 10 Drawing Sheets

Hospital Admission Form
☐ Medical Center A
☐ Medical Center B

| NURSING ADMINISTRATION DATA BASE |
|---|
| Reason for Admission: _____ |

Language Spoken:
☐ English  ☐ Other
☐ Spanish
☐ Interpreter Available

Weight: _____ ☐ Lb ☐ Kg
Height _____ ☐ Lb ☐ Kg
☐ Reported  ☐ Weighed
Information From:
☐ Patient
☐ _____

Current Medications:
_____
_____
_____
_____
Allergies (Med; Food):
_____
_____
_____

Pretests:
Lab:
_____
_____
_____
_____

EKG.

1. H.E.E.N.T   ☐ Denies Problems
☐ Glaucoma      ☐ Cataract R/L      ☐ Diplopia
☐ Blind R/L     ☐ Hearing Loss R/L  ☐ Low Vision: R/L
☐ Sinus Problems ☐ Sore Throat      ☐ Nose Bleed

· · ·

2. CARIDO-CIRCULATORY   ☐ Denies Problems
☐ Edema         ☐ Bruising          ☐ Pain
☐ Hypertension  ☐ Hx CAD            ☐ Pacemaker
☐ Hx MI         ☐ Vascular Access Devices

| FIGURE 3A |
|---|
| FIGURE 3B |

Boundary Box for Defining Object (Section of Form)    Scanned Image

```
2. CARDIO-CIRCULATORY    ☐ Denies Problems
☐ Edema        ☐ Bruising     ☐ Pain
☐ Hypertension ☐ Hx CAD       ☐ Pacemaker
☐ Hx MI        ☐ Vascular Access Devices
```

FIGURE 4

Boundary Box for Defining Object (Section Name)    Scanned Image

```
⌐ 2. CARDIO-CIRCULATORY ¬   ☐ Denies Problems
☐ Edema        ☐ Bruising     ☐ Pain
☐ Hypertension ☐ Hx CAD       ☐ Pacemaker
☐ Hx MI        ☐ Vascular Access Devices
```

FIGURE 5

Boundary Box for Defining Object (Button with Checkbox)    Scanned Image

```
2. CARDIO-CIRCULATORY    ☐ Denies Problems
⌐☐ Edema ¬     ☐ Bruising     ☐ Pain
☐ Hypertension ☐ Hx CAD       ☐ Pacemaker
☐ Hx MI        ☐ Vascular Access Devices
```

Boundary Box for Defining Object (TextBox)

FIGURE 6

| PROPERTIES | |
|---|---|
| Object/Field Name: | CheckBox1 |
| Field Type | Button with Checkbox |
| Height | 30 |
| Width | 157 |
| Top, Left | 2086, 518 |
| Button Title | Glaucoma |
| Database Link | Hsp11.Adm.HEENT.Glcm |
| Parent Section | HEENT |
| Voice Command | glaucoma |
| Exclusive | No |
| Popup Menu | Glcm |
| ⋮ | ⋮ |

FIGURE 7

Button / Popup Menu Definition Dialog

Title: Glaucoma

Style: 3 - Choice List
- 0 - Auto
- 1 - ShowTitle / Nonexclusive
- 2 - ShowTitle / Exclusive
- 3 - Choice List
- 4 - Fill In Only
- 5 - Choice List/Fill In Combo
- ⋮

Textbox Link: none
- none
- textbox1
- textbox2
- textbox3
- textbox4
- ⋮

Choice List Definition Dialog
226

FIGURE 8

Hospital Admission Form

☐ Medical Center A
☐ Medical Center B

NURSING ADMINISTRATION DATA BASE
Reason for Admission: _____

Green Lines Indicate Section Boundaries

Language Spoken:
☐ English   ☐ Other
☐ Spanish
☐ Interpreter Available

Current Medications:
_____

Weight: _____ ☐ Lb ☐ Kg
Height _____ ☐ Lb ☐ Kg
☐ Reported ☐ Weighed
Information From:
☐ Patient Allergies (Med; Food):
_____

1. H.E.E.N.T    Denies Problems
☐ Glaucoma    ☐ Cataract R/L    ☐ Diplopia
☐ Blind R/L    ☐ Hearing Loss R/L    ☐ Low Vision: R/L
☐ Sinus Problems    ☐ Sore Throat    ☐ Nose Bleed Red Highlighted Region Indicates Exclusive Button with Checkbox Yellow Highlighted Region Indicates Non-Exclusive Button with Checkbox Blue Highlighted Region Indicates TextBox, Purple Highlighted Region Indicates Section Name Pink Highlighted Region Indicates Button With Fill In

FIGURE 9

| FIGURE 10 | FIGURE 10A |
| --- | --- |
|  | FIGURE 10B |

SYSTEM AND METHOD FOR GENERATING DATABASE INPUT FORMS

The present invention relates generally to generating database data input forms, and particularly to a system and method for generating computerized database data input forms from printed data forms and for customizing database data input forms for efficient use by end users.

BACKGROUND OF THE INVENTION

Many database programs include user interface software and programming tools for defining data entry forms, and for linking fields in those data entry forms to fields in database tables. While the prior art contains a variety of such user interface programming tools, there is a need for improved user interface software that is specifically designed to facilitate the conversion of an existing non-computerized (i.e., paper) data entry form into a computer based data entry form.

Many institutions continue to use paper based data entry forms, with data from completed paper forms being entered into computers by different personnel than those who fill in the paper forms. With the growing availability of limited and unlimited vocabulary voice recognition systems, the inventors of the present invention believe the division of duties between data gathering and computerized data entry can be eliminated in many more situations than would previously have been possible.

SUMMARY OF THE INVENTION

In summary, the present invention is a system for generating computer data entry forms in which a scanner is used to scan an existing data entry form and to generate a digitized representation of the data entry form. The system's user interface includes a display for displaying images, a microphone for receiving voiced data and commands, and a mouse, keyboard, pen and/or touchscreen for non-voice based data entry.

Numerous voice files are stored in the system's computer memory, each voice file representing voice recognition information associated with a predefined word or phrase. Also stored in the system's computer memory is a database for storing information, such as records associated with operation of a business.

The present invention provides a set of form definition procedures, responsive to user commands, including an imaging procedure for displaying at least a portion of the scanned data entry form on the display and a region definition procedure for enabling a user to indicate regions of the displayed data entry form.

Object definition procedures are provided for enabling a user to define a multiplicity of objects, including form sections and subsections, text boxes, checkbox buttons and popup menus, and for specifying properties of the defined objects. The object properties that can be specified include (A) database links for linking selected objects to respective specified fields in the database, (B) exclusionary relationships for specifying which objects cannot be selected by end users when others of the objects have previously been selected, and (C) voice file links indicating which ones of the voice files to use for end user voiced selection of the objects. The object definition procedures store, in a form definition data structure in the computer system's memory, form definition data corresponding to the user defined objects and user specified object properties.

A computerized form data entry procedure coupled to the microphone and the form definition data structure responds to end user voiced commands and end user selection of the previously defined objects in the form by displaying on the display a representation of the data entry form with visual indications of objects selected by the end user and by storing corresponding data in the database.

The scanned form can be color coded to indicate different objects in the form and color information in the form's digitized representation is automatically decoded to generate object and object property definitions. The use of color coding, by highlighting different sections of the printed data entry form with different colors to indicate the functions of each colored section reduces the amount of work associated with defining a computer based data entry form.

BRIEF DESCRIPTION OF THE DRAWINGS

Additional objects and features of the invention will be more readily apparent from the following detailed description and appended claims when taken in conjunction with the drawings, in which:

FIG. 2 depicts an example of a paper based data entry form.

FIGS. 4, 5 and 6 show the visual display generated by the form conversion process of FIG. 3 while defining various form objects.

FIGS. 7 and 8 depict dialog boxes used during the form conversion process to specify properties of the form objects.

FIG. 9 depicts a paper based data entry form that has been color coded to specify many of the form objects and some of the object properties for a corresponding computerized data entry form.

DESCRIPTION OF THE PREFERRED EMBODIMENTS

Figure 1:
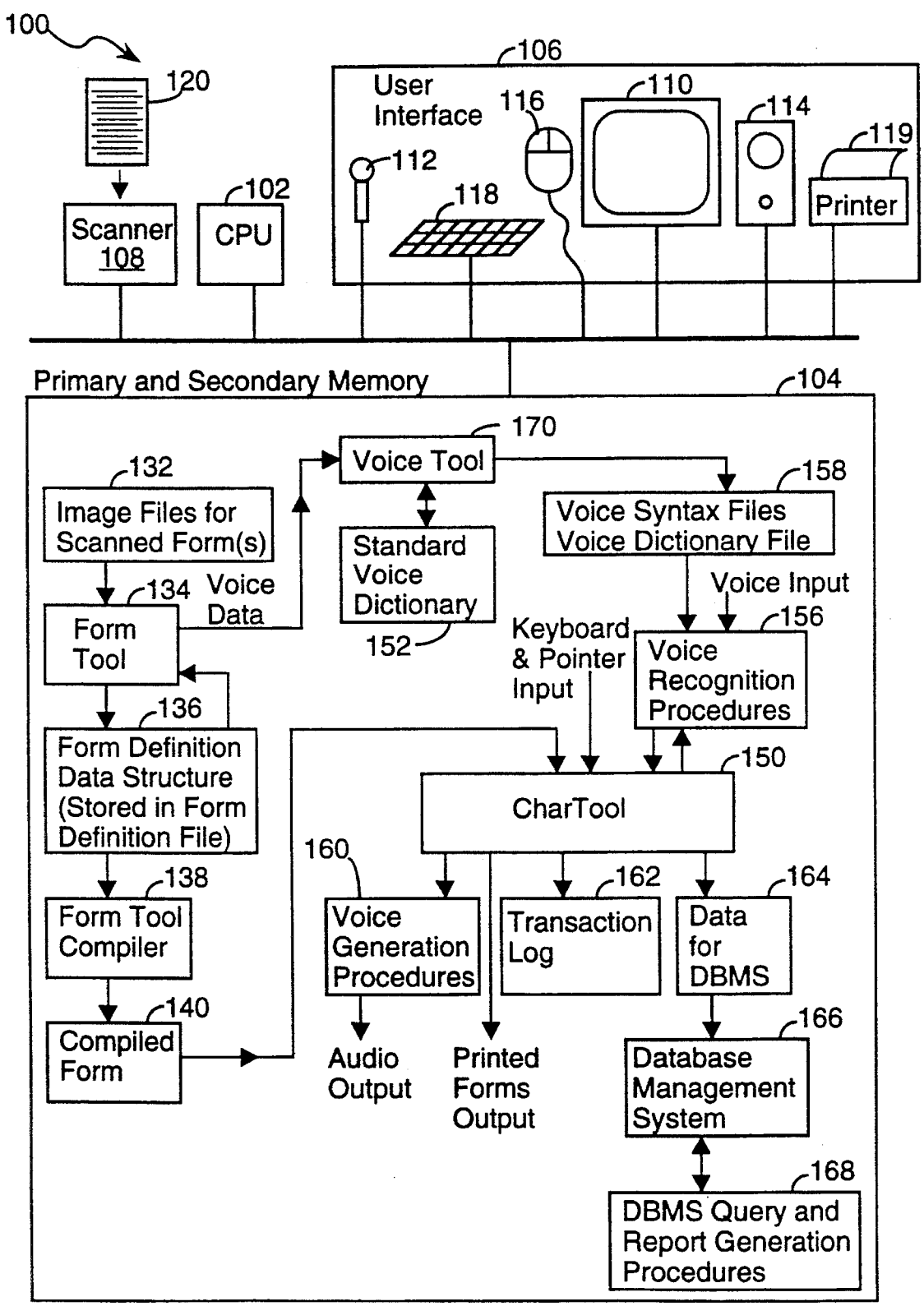
FIG. 1 is a block diagram of a computer system for converting paper based data entry forms into computer based data entry forms and for then using the computer based data entry forms to collect and store data, where data entry using a variety of input devices, including voice input devices, is supported.

Referring to FIG. 1, a computer system 100 incorporating the present invention includes a central processing unit 102, primary and secondary computer memory subsystems 104, a user interface 106 and a document scanner 108. The user interface 106 typically includes a display 110, a microphone 112, an audio speaker 114, and a pointing device 116 such as a mouse or trackball. In the preferred embodiment, the user interface 106 also includes a keyboard 118 for entering text and a printer 119. The scanner 108 is used to scan in paper based data entry forms 120, which is the first step of the process for generating a computer based data entry form in the present invention.

The computer memory 104 stores a number of different programs, sometimes herein called procedures, and data structures. Whenever a paper based data entry form is scanned by scanner 108, the resulting image file 132 is stored in computer memory 104. A set of procedures collectively called the "Form Tool" are used to generate a computer based data entry form that is based on the scanned paper based data entry form.

More specifically, the Form Tool 134 stores data in a form definition data structure 136 representing all the objects and object properties required to represent a computer based data entry form, and that data structure 136 is stored as a "Form Definition File" in the computer memory 104. The form definition data structure 136 in the form definition file is then converted by a "compiler" into a "compiled form" 140 for use by a set of data collection procedures collectively called the "Char Tool" 150. The form definition file is preferably a text file editable using conventional text editor programs, while the compiled form 140 is a binary file that is not editable using conventional text editor programs.

The Form Tool 134 also contains procedures for passing a list of all voice commands defined for a form to a procedure herein called the Voice Tool 170. The Voice Tool 170 generates one Voice Dictionary 158A and a set of Voice Syntax Files 158B for each data entry form (see FIG. 11). The Voice Dictionary 158A for a particular data entry form stores phoneme strings that describe the pronunciation of words associated with various form sections, textboxes and buttons as well as form navigation commands common to all data entry forms. To the extent possible, the phoneme strings in the voice dictionary file 158A are obtained by the Voice Tool 170 from a standard voice dictionary 152 of several tens of thousands of commonly spoken words. For words not in the Standard Voice Dictionary 152 but specified during the form definition process, phoneme strings to be included in the voice dictionary 158 are generated using a set of pronunciation rules. The entry in the Voice Dictionary File 158A for any particular voice command stores the information necessary to generate a synthesized audio signal that sounds like that specific word or phrase and to recognize voice input of that specific word or phrase.

The Voice Tool 170 generates a separate Voice Syntax File 158B for each distinct context in a data entry form. Each Voice Syntax File 158B represents all the legal voiced commands that a user can specify at a particular point in the data entry process. More particularly, each Voice Syntax file 158B includes pointers to all the words and/or phrases in the Voice Dictionary 158A that are candidates for voice recognition, and also specifies all the different words and word orderings that can be used to make various particular data entries. For instance, after selecting a particular form section, the corresponding voice syntax file will include all syntax strings for all voiced commands that are "legal" from that position in the form. At any point in the process of entering data in a particular data entry form, actual voice input is interpreted using the Voice Dictionary 158A for the entire data entry form, and the Voice Syntax File 158B for the context currently selected or specified by the end user's previously entered commands.

After a computerized data entry form has been defined and stored in compiled form 140, end users utilize the computerized data entry form for data entry. The Char Tool procedures 150 control the data entry process. In particular, based on the form being used and the section, if any, that the user has selected, the Char Tool procedures 150 select one of the previously defined Voice Syntax files, which establishes the set of legal voice inputs for that context. The selected Voice Syntax file governs the operation of the voice recognition procedures 156 until another Voice Snytax file is selected for a different form context. A new voice syntax file (context) is loaded by the Char Tool procedures 150 each time the user enters a new section of a data entry form.

The voice recognition procedures 156 utilize the Voice Syntax files and Voice Dictionary file 158 described above, which define a rule base for interpreting voice inputs. When the voice recognition procedures 156 match an end user's voice input with an entry in the currently selected voice syntax file, the voice recognition procedures return to the Char Tool 150 a value that directly identifies a corresponding user command, which may indicate selection of an object in the data form or may be a form navigation command. The Char Tool procedures 150 also receives information about the specific words spoken by the end user, but in most contexts that information is not used. In an alternate embodiment of the present invention, the Char Tool procedures 150 uses the detailed information about the end user's spoken words so as to enter dicated sequences of words into data entry fields in the data entry form. In the preferred embodiment, audio feedback is not provided when the user checks checkboxes or fills in text using a mouse, pen or keyboard input device.

The Voice Dictionary file 158A is also used by a set of Voice Generation procedures 160 to optionally verbally confirm the end user's verbal commands. Verbal confirmation helps the end user to catch and correct errors made by the voice recognition procedures 156.

The Char Tool 150 accepts keyboard and/or pointer inputs from end users as well as voice inputs. Once an end user has completed entering data in a form, the entered data is stored both in a transaction log 162 and as a set of data 164 to be stored in specified fields of a database in a database management system 166. As is standard, data stored in the database management system is accessible through a set of database query and report generation procedures 168.

FIG. 2 depicts an example of a paper based data entry form. As is the case for many data entry forms, the form is divided into a number of distinct sections, some of which call for checking various boxes applicable to a particular data entry situation, some of which call for entry of text and/or numbers, and some of which may call both for checking boxes and entry of text and/or numbers. Furthermore, most although not necessarily all sections of a data entry include a title or label that helps the user identify the form section. For the purposes of explaining the present invention, we will assume that the scanner 108 has been used to scan in the paper based data entry form shown in FIG. 2.

Figures 3, 3A:
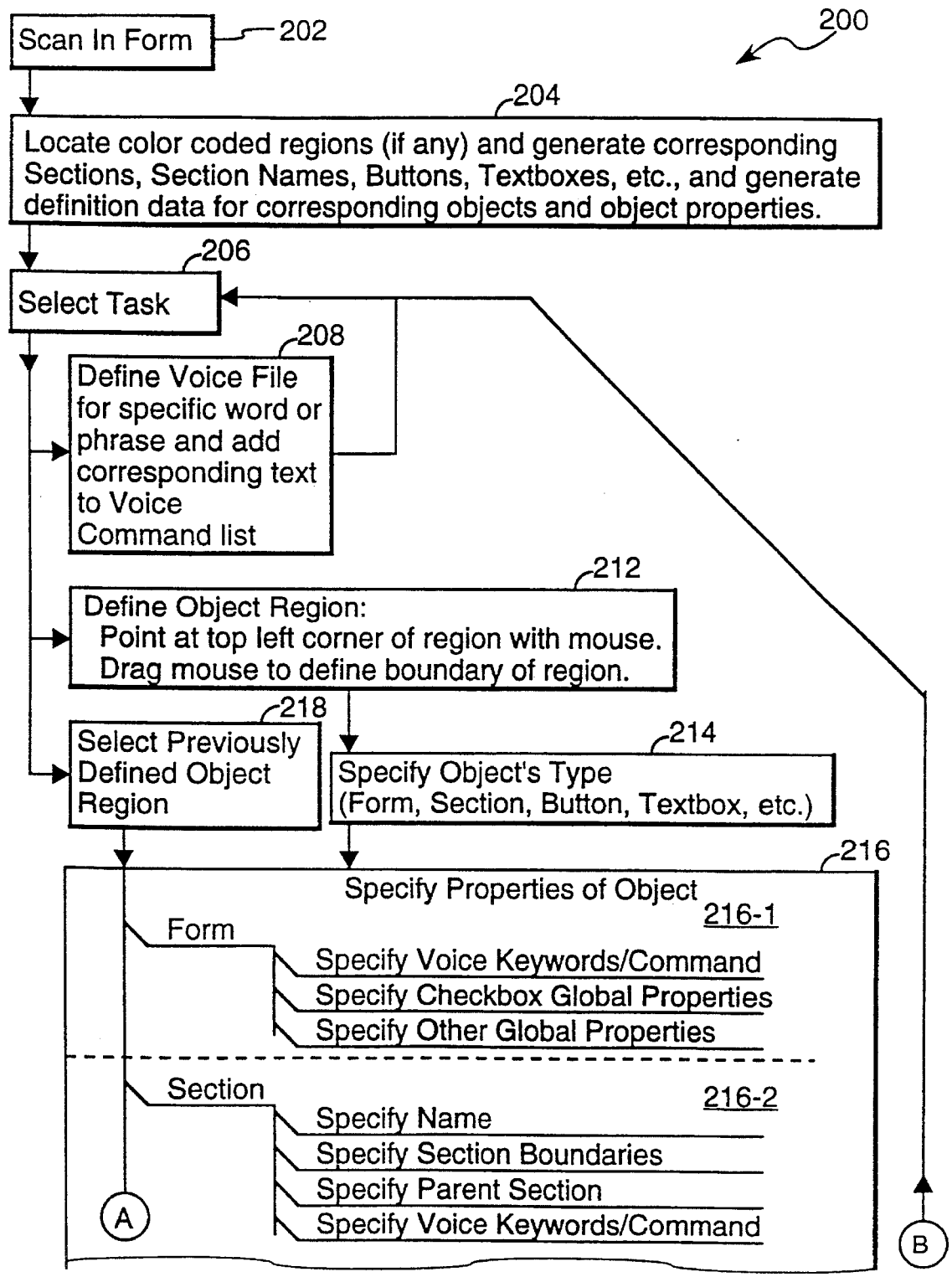
FIG. 3 (including FIGS. 3A and 3B) is a flow chart of the process for generating a computer based data entry form from a paper based data entry form.
Figure 3B:
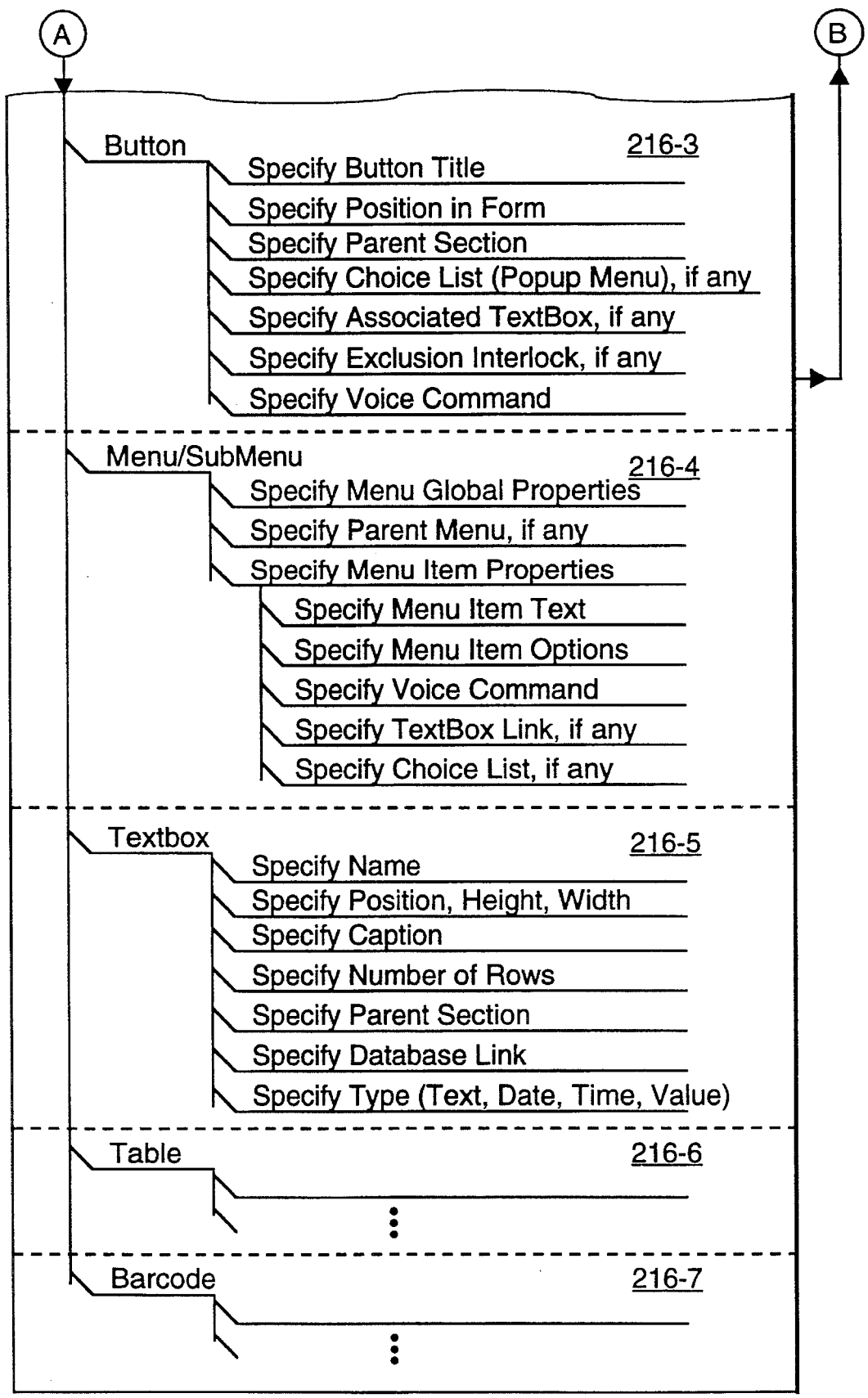

FIG. 3 is a flow chart of the process 200 for generating a computer based data entry form from a paper based data entry form. The process begins at step 202 with scanning in a paper based data entry form.

To understand the data entry form generation process, one must first understand how a computer based data entry form is represented in the form definition data structure 136. In the preferred embodiment, each aspect of a data entry form is defined as an "object". Thus, logical sections of the data entry form are each object, each checkbox button and its associated text or fill in line is an object, each text box for entry of data is an object, and fixed text labels for form sections and text boxes are also objects. Each object has a specified physical location or position (e.g., position of its top left corner) and extent (i.e., height and width) within the form. Each object also has a set of specified properties including (A) links for linking the object to a specified field in a database, (B) exclusionary relationships for specifying which objects cannot be selected by end users when a specified other object has previously been selected by the end user, and (C) a voice file link indicating which one of the voice files to use for end user voiced selection of the object. Table 1 contains an example of a portion of the form definition data structure 136 for a specific data entry form.

TABLE 1

EXAMPLE OF FORM DEFINITION DATA STRUCTURE

```
BEGIN OBJECT
Object Name:       Admission Form
Object Type:       Form
Form Size:         Height: 25 cm, Width: 20 cm
Global Property1:  Default Checkbox Size: 1 cm × 1 cm
Global Property2:  Default Database Table: Hosp.Adm
Global Property3:  Default Voice Dictionary File: VDctnry.cks
END OBJECT
BEGIN OBJECT
Object Name:       Admission Patient History
Object Type:       Form Section
Object Location:   Top: 2.5 cm, Left: 3.0 cm
Object Size:       Height: 12.2 cm, Width 17 cm
Parent Link:       Admission Form
Database Link:     N/A
Voice File Link:   VP.History
END OBJECT
BEGIN OBJECT
Object Name:       Button 1
Object Type:       Button with Checkbox
Object Location:   Top: 2.7 cm, Left: 3.5 cm
Object Size:       Height: 1.2 cm, Width 10 cm
Parent Link:       Admission Patient History
Database Link:     default.HEENT.Glcm
Voice File Link:   VP.Glcm
Object Property1:  Auto/*standard button with checkbox*/
END OBJECT
. . .
```

Step 204 concerns the color coding or highlighting on the scanned in form to facilitate the conversion of the form into a computer based data entry form.

The handling of color coded regions will be discussed in detail below with reference to FIGS. 9 and 10.

At step 206, the user who is defining the data entry form selects one of the form definition steps 208, 212, 214, 216 and 218.

For each object in the data form, the user specifies all necessary voice commands and keywords in the associated object "property" dialog window. The Form Tool 134 and Voice Tool 170 procedures (see FIG. 1) generate a Voice Dictionary for the entire form and a Voice Syntax file 158 for each context (e.g., section) of the data form based on the text of the specified commands and keywords.

At step 212 an object region is defined. In particular, an image of the scanned form is displayed while the user employs a pointing device 116 (FIG. 1) to mark a boundary box over the portion of the displayed image, where the boundary box marks the boundary of the form region associated with an object. FIG. 4 shows an example of a user specified boundary box that indicates the extent of a section of a scanned form. From the user specified boundary box, the Form Tool procedures determine the location of the top left corner of the object as well as the object's length and width.

FIG. 5 shows an example of a user specified boundary box that indicates the extent of a label object, which in this example identifies a section of a data entry form. FIG. 6 shows two user specified boundary boxes superimposed over a portion of the scanned data entry form. The first of the user specified boundary boxes marks the position and extent of a checkbox button, while the second of the user specified boundary boxes marks the position and extent of a textbox.

Next, after defining an object's physical position and extent, the object's type is specified by the user at step 214 from a list of the defined object types.

From there, at step 216, the user defines the properties of the defined object, with the set of properties to be defined depending on the type of the object.

As shown in FIG. 3, at step 216-1 the user defines global properties for the entire form. Global properties include the form's name, total size, a default size for button checkboxes, and a default database table to which objects in the form will be linked.

At step 216-2 the user specifies properties of a section object, which represents a section of the form. The properties to be specified are the section object's name, its boundaries (which can be revised in the property specification process), and the identity of its "parent". For top level sections, the parent is the form itself. Sections, however, can be arranged hierarchically, and thus a section of a form can have a plurality of subsections, and the section objects corresponding to those subsections must each be assigned a parent. The parent of a form subsection is normally the smallest section that totally encompasses the form subsection.

At step 216-3 the user specifies properties of a button object. As shown in FIGS. 3 and 7, the properties of a button object defined at steps 212 and 214 are specified by the user through the use of an object properties specification dialog at step 216. FIG. 7 shows the user interface 220 for the object properties specification dialog for a button object. Some properties (e.g., the object's type, location and extent) shown in the properties specification dialog simply reflect information specified in steps 212 and 214 that can be manually adjusted by the user, while others are specified solely through the properties specification dialog. A number of the object properties are specified by "clicking" (with the pointer device 116) on one of the property type names, so as to bring up another user interface dialog. For instance, FIG. 8 shows the user interface dialog generated when the user clicks on the Popup Menu field 222 of the Properties dialog in FIG. 7.

As shown in FIG. 8, each button object is assigned a title, a style, an optional textbox link, and an optional choice list. The Popup Menu dialog 224 of FIG. 8 is used to define the text shown next to a button's checkbox, as well as to determine the operation of the button. For instance, an end user's selection of the button will bring up a choice list if the Style of the button is specified to be Style number 3. The choice list associated with the button is defined (step 216-4 in FIG. 3) in another dialog box represented in FIG. 8 at 226. If the user defining the form wants the choice list brought up by user selection of the button to also allow the user to enter text not found in the choice list, then the user selects Style 5. To define a button whose text must always entered by the end user, the user selects Style 4 (Fill-In Only).

A button with a fixed text next to the checkbox is defined by selection of Style 1, with the text being the "title" shown at the top of the dialog box. A button whose selection prevents the selection of any other buttons in the same form section or subsection (i.e., all other buttons having the same specified parent) is defined by selection of Style 2, with the text being the "title" shown at the top of the dialog box.

When a popup menu is assigned a textbox link, the item selected by the end user from the choice list, or the fill in text which the user enters, is displayed in the textbox to which the popup menu is linked. The dialog box shown in FIG. 8 is also used to specify the textbox to which a popup menu is linked.

At step 216-5 the user specifies properties of a textbox object. In particular a textbox object must be assigned a name, a caption (which is text displayed within the textbox to identify the textbox for end users), a position and extent within the form, a number of rows (i.e., lines for displaying multiple lines of text), and a parent section. Optionally, a textbox can also be assigned a database link to a specific field in a database table.

At step 216-6 and 216-7 the user specified properties of table objects and barcode objects. A table object, is an object having rows and columns, with spaces where the end user can enter either check marks or data (numeric or alphanumeric). A barcode object is one whose value is set by scanning a barcode with an appropriate sensor. The user enters data for barcode objects by scanning the sensor over an appropriate barcode. Another object type that may be defined using the present invention (but not shown in the Figures) is a "draw object" which is a field in which the end user may draw an image using either light pen or other pointing device, and the resulting image is stored as an image.

At step 206 the user who is defining the data entry form can select any of the previously defined objects so as to view and/or revise the definition of any previously defined object.

COLOR CODED DATA ENTRY FORMS

As can be seen from the above explanation of the data entry form definition process, even with the assistance of a scanned in paper based data entry form, defining a computer based data entry form is still a fairly tedious process because every single form object must be separately defined and its properties separately specified. Defining a typical one-page computer based data entry form typically takes 0.5 to 2 hours, depending on the number of objects and the number of choice lists associated with those objects.

Referring to FIG. 9, the present invention also provides a system and method for reducing the amount of work associated with converting a paper based data entry form into a computer based data entry form. In particular, a paper based data entry form can be color coded prior to scanning it into the computer system as specified in Table 2.

TABLE 2

| Color | Color Method | Associated Object |
|---|---|---|
| Color 1/ Green | Surround Region | Form Section or Subsection. Colored lines mark section boundary |
| Color 2/ Yellow | Highlight Region | Button with checkbox. Convert image to text. Specify button title as converted text. Specify parent section as smallest surrounding form section or subsection. |
| Color 3/ Red | Highlight | Button with checkbox. Convert image to text. Specify button title as converted text. Mark button as exclusive. Specify parent section as smallest surrounding form section or subsection. |
| Color 4/ Pink | Highlight | Button with checkbox with text fill in. Specify parent section as smallest surrounding form section or subsection. |
| Color 5/ Blue | Highlight | Textbox. Specify parent section as smallest surrounding form section or subsection. |
| Color 6/ Purple | Highlight | Title or Name for Section or Text Box. Convert image to text. Specify converted text and name for smallest surrounding textbox or form section or subsection. |

TABLE 2-continued

COLOR CODINGS EXAMPLE

Figure 10A:
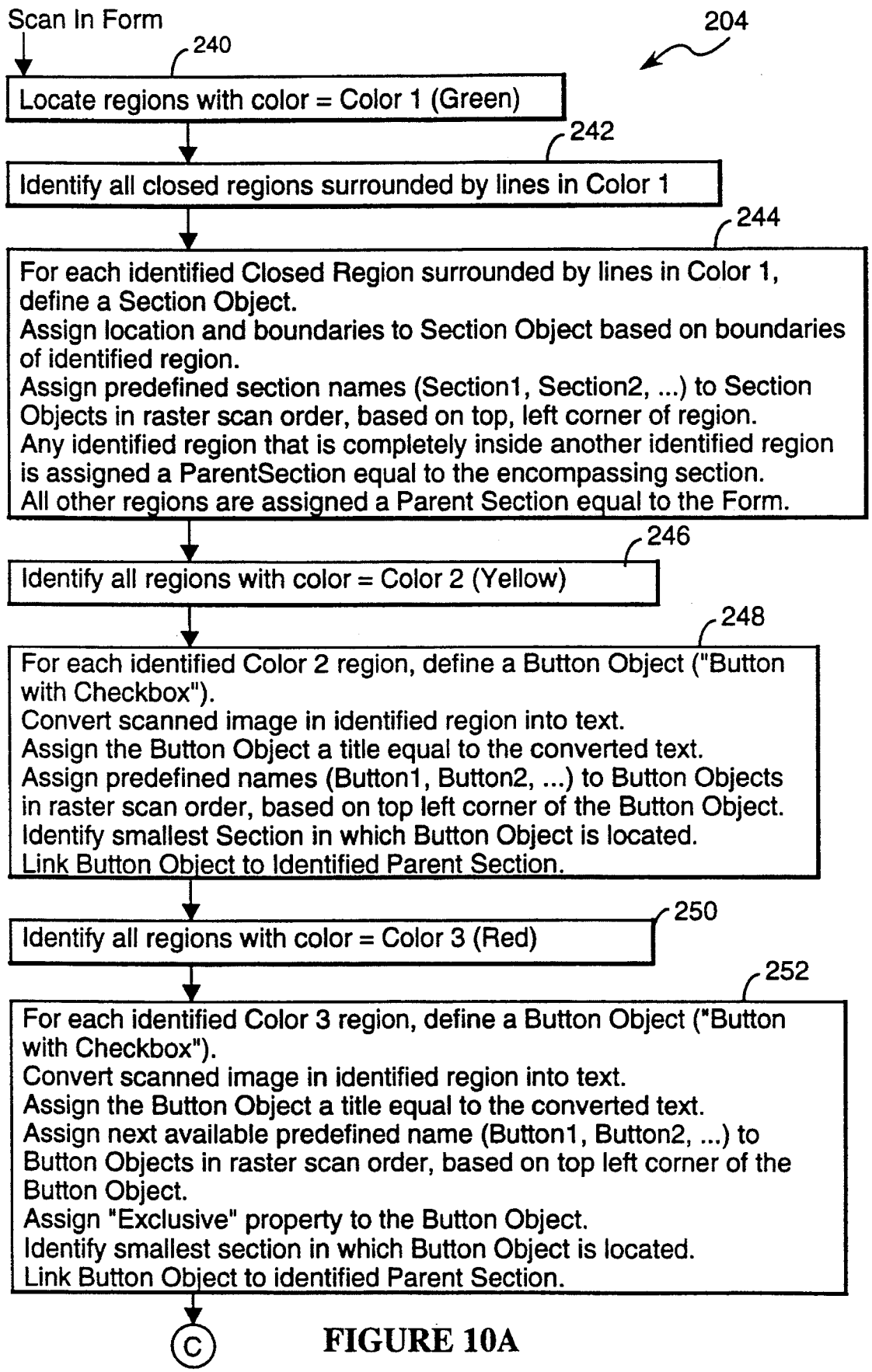
FIG. 10 (including FIGS. 10A and 10B) is a flow chart of the process for interpreting the color codings on a scanned paper based data entry sheet and for automatically defining, without human assistance, form objects and specifying form object properties based on the color codings.
Figure 10B:
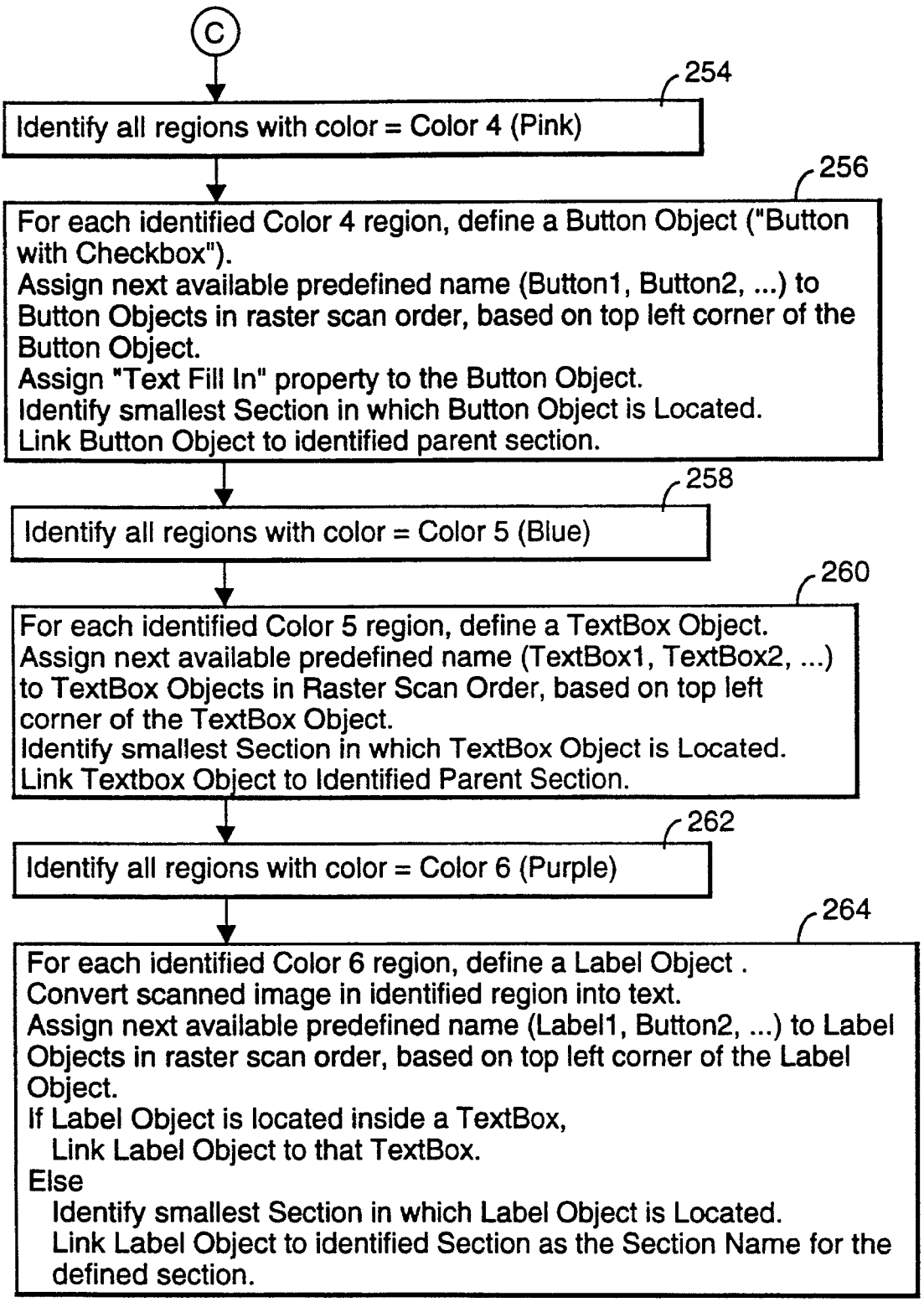

Referring to FIG. 10, the procedure for decoding color coded regions of a scanned in data entry form (step 204 in FIG. 3) works as follows. Note that each object defined and each object property specified by the color decoding procedure 204 is stored in the data form definition data structure in the same way as objects and properties defined by a human user. Furthermore, the set of objects and properties generated by the color decoding procedure become the starting point for the form definition process performed in conjunction with a human user's input. Thus, as will be seen, the color decoding procedure can significantly reduce the amount of work by a human user to define a computer based data entry form.

At step 240, all regions of the scanned form matching a first color (e.g., green) are identified. Next, at step 242, these regions are analyzed to identify all closed regions that are surrounded by lines in the first color. For each identified closed region, a section object is defined at step 244. The section object is assigned a location and extent based on the boundaries of the identified closed region. The form sections are preferably processed in raster scan order based on the position of their top left corner (i.e., sections at the higher vertical positions are processed before sections at lower vertical positions and sections with equal vertical positions are processed from left to right) and are assigned predefined section names (e.g., Section 1, Section2, and so on). Any defined form section that is completely inside another form section is assigned a parent section equal to the smallest encompassing section, and all other form sections are assigned a parent section equal to the form.

At step 246, all regions of the scanned form matching a second color (e.g., yellow) are identified. For each identified region, a button with checkbox object is defined at step 248. The button object is assigned a location and extent based on the boundaries of the identified region. The button objects are processed in raster scan order based on the position of their top left corner and are assigned predefined button names (e.g., Button1, Button2, and so on). The scanned image in the identified region is converted into text using convention image to text conversion techniques, and the resulting text is used as the button's title. The smallest form section or subsection in which the button is located is identified, and the button object is linked to the identified form section as its parent section.

At step 250, all regions of the scanned form matching a third color (e.g., red) are identified. For each identified region, a button with checkbox object is defined at step 252. The button object is assigned a location and extent based on the boundaries of the identified region. The button objects are preferably processed in raster scan order based on the position of their top left corners and are assigned predefined button names (e.g., Button1, Button2, and so on). The scanned image in the identified region is converted into text and used as the button's title. The smallest form section or subsection in which the button is located is identified, and the button object is linked to the identified form section as its parent section. Finally, the button object is assigned the "exclusive" property, meaning that its selection by an end user will prevent selection of any other buttons with the same parent section.

At step 254, all regions of the scanned form matching a fourth color (e.g., pink are identified). For each identified region, a button with checkbox object is defined at step 256. The button object is assigned a location and extent based on the boundaries of the identified region. The button objects are preferably processed in raster scan order based on the position of their top left corners and are assigned predefined button names (e.g., Button1, Button2, and so on). The button is assigned the "text fill in" property or style. The smallest form section or subsection in which the button is located is identified, and the button object is linked to the identified form section as its parent section.

At step 258, all regions of the scanned form matching a fifth color (e.g., blue are identified). For each identified region, a textbox object is defined at step 260. The textbox object is assigned a location and extent based on the boundaries of the identified region. The textbox objects are processed in raster scan order based on the position of their top left corner and are assigned predefined names (e.g., Textbox1, Textbox2, and so on). The smallest form section or subsection in which the textbox is located is identified, and the textbox object is linked to the identified form section as its parent section.

At step 262, all regions of the scanned form matching a sixth color (e.g., purple are identified). For each identified region, a label object is defined at step 264. The label object is assigned a location and extent based on the boundaries of the identified region. The label objects are processed in raster scan order based on the position of their top left corner and are assigned predefined names (e.g., Label1, Label2, and so on). The scanned image in the identified region is either (A) converted into text (using conventional "scanned image character recognition" software products) and used as the label objects title, or (B) used directly as the label (i.e., the scanned image is used as the label). The smallest textbox, form section or subsection in which the label is located is identified. When the label is in a textbox, the label object is linked to the identified textbox or as a textbox label. When the label is in a form section, the label object is linked to the identified form section as a section name, thereby overriding the section name assigned to the section at step 244.

As will be understood by those skilled in the art, the colors used in the above described preferred embodiment are arbitrary and different color assignments could be used in alternate embodiments of the invention. Furthermore, alternate embodiments of the present invention could use a different color coding scheme in which different object definitions and different object properties are signified by different colors than those used in preferred embodiment. Furthermore, the color assignments to different object types could easily be made user definable though a color assignment dialog similar to the color wheel dialogues found in many existing computer software products.

Data Entry by End User Voice Input

While speech recognition is beyond the scope of this document, a brief supplement to the earlier discussion of the Char Tool is provided to show how the compiled form definition data structure is used for data entry.

Figure 11:
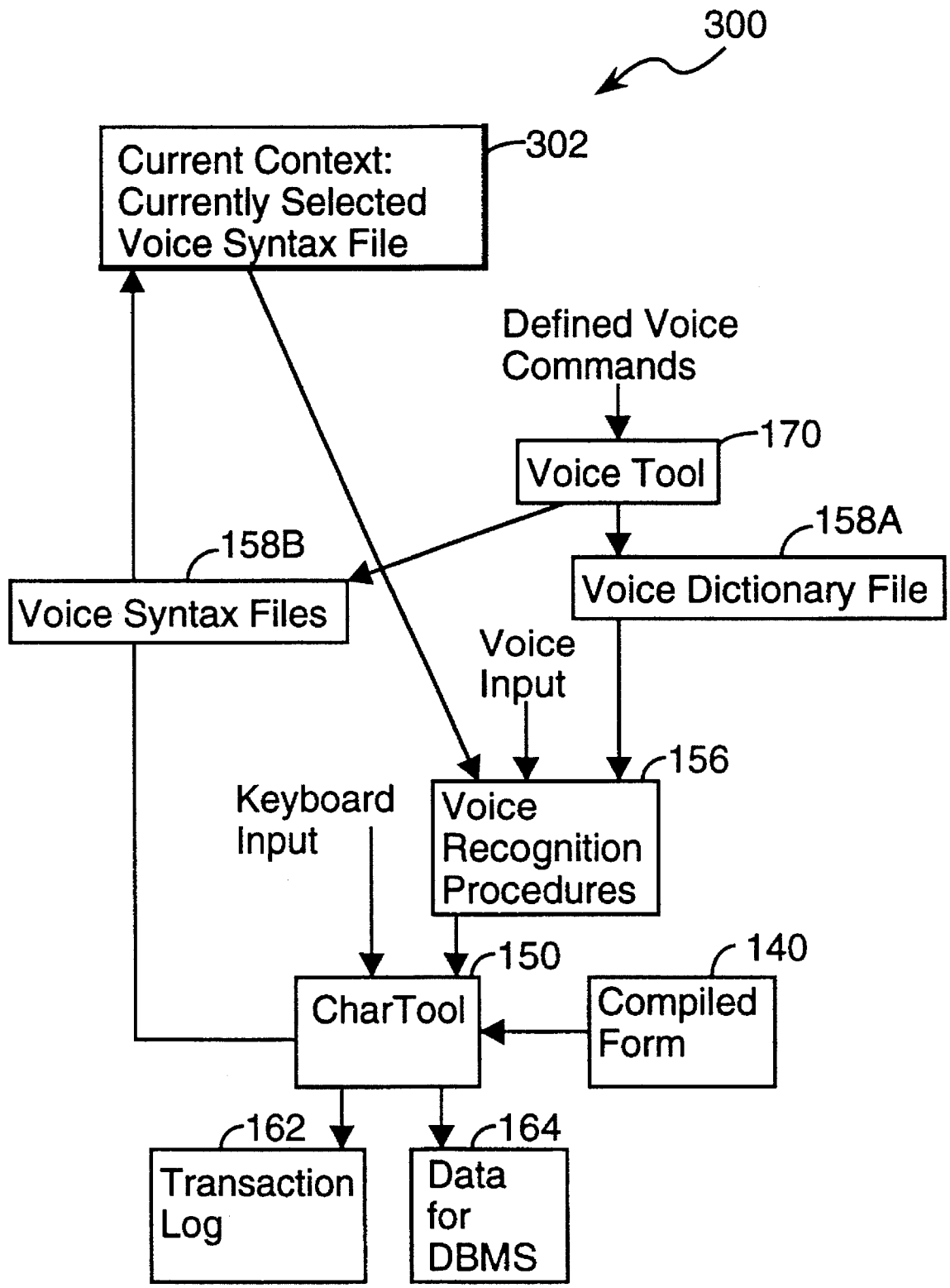
FIG. 11 is a block diagram of a portion of a computer system for utilizing the computer based data entry form of the present invention for voice input based data collection.

Referring to FIG. 11, the end user subsystem 300 in the preferred embodiment includes a Voice Dictionary 158A which stores phoneme strings that describe the pronunciation of words associated with various form sections, textboxes and buttons as well as form navigation commands common to all data entry forms. Navigation commands include words such as "cancel," "close," "remove," and so on. To the extent possible, the phoneme strings in Voice Dictionary 158A are selected from a standard dictionary of several tens of thousands of commonly spoken words. For words not in the standard dictionary but specified during the form definition process, phoneme strings to be included in the Voice Dictionary 158A are generated using a set of pronunciation rules.

To implement speech recognition without requiring the end user to learn about computer technology, the end user subsystem 300 allows end users to say as little or as much as he/she wants so long as he/she uniquely identifies one of the available items in each context. For example, if the items listed in a menu are "in the right eye," "in the left eye," and "in both eyes," the voice syntax file for one specified menu item allows the user to select the first item by saying "left," "left eye," "the left," or "in the left eye." All these possible syntaxes are automatically generated by the voice tool 170 and are stored in the voice syntax files 158B.

The current context 302 of the data entry process defines which Voice Syntax file 158B is to be used to decode the next voice input. The context 302 is dynamically updated by the Char Tool procedures 150 during data entry. Each Voice Syntax file 158B includes pointers to all the words and/or phrases in the Voice Dictionary 158A that are currently candidates for voice recognition. The use of a separate Voice Syntax for each data entry context helps to limit the number of possible words that voice inputs need to be compared with and reduces the number of wrong matches made.

During the data entry process, the display is constantly updated to let the user know the set of available choices for voice input as well as to show the data previously entered in the form section last selected by the end user. When the end user speaks, the voice recognition procedures 156 respond by sending a list of recognized words and a "parse tag" to the Char Tool. The parse tag identifies the spoken menu item or form object without unnecessary detail. For instance, regardless whether the end user says "left," "left eye," "the left," or "in the left eye," the Char Tool receives the same "left" parse tag which identifies a menu item without additional analysis by the Char Tool program.

To support more productive use of speech recognition, the list of legal syntaxes has been expanded to enable an end user to more efficiently move through a data form's sections. Without this improvement, to enter data in a hospital admission form indicating that a patient has glaucoma in his left eye and has sinus problems, the end user must say something similar to the following:

TABLE 3

| Limited Syntax System | |
| --- | --- |
| Sequence of spoken phrases | Corresponding Actions Performed by Char Tool |
| "history" | /*select history form section*/ |
| "h e e n t" | /*selection subsection for ears, eyes, nose and throat*/ |

TABLE 3-continued

Limited Syntax System

| Sequence of spoken phrases | Corresponding Actions Performed by Char Tool |
|---|---|
| "glaucoma" | /*select button*/ |
| "left eye" | /*select item in choice list popup menu for glaucoma*/ |
| "finished" | /*close choice list popup menu*/ |
| "sinus" | /*select button*/ |
| "right side" | /*select item in choice list popup menu for sinus*/ |

With the expanded list of legal syntaxes, the end user can enter the same data by saying:

TABLE 4

Expanded Syntax System

| Sequence of spoken phrases | Corresponding Actions Performed by Char Tool |
|---|---|
| "history" | /*select history form section*/ |
| "h e e n t" | /*selection subsection for ears, eyes, nose and throat*/ |
| "glaucoma in the left eye" | /*select button, then select item in choice list popup menu for glaucoma, then close choice list popup menu*/ |
| "sinus with pain on the right side" | /*select button, then select item in choice list popup menu for sinus*/ |

The advantage of this approach is that the interaction is simpler and quicker because it skips one level of menu selection. A possible disadvantage is that it provides the end user with less guidance about what to say. However, since the system supports both data entry methodologies, end users with less experience can use the more methodical approach while more experienced users can be more efficient.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for facilitating the conversion of paper based data entry forms to fully reusable electronic computer based data entry forms to specifying data to be stored in a database, said database storing data in records each having a plurality of fields, said system comprising:

a scanner for scanning an existing data entry form and for generating a digitized representation of said data entry form; said digitized representation including color information;

a display for displaying images;

a form definition data structure for storing data representing said scanned data entry form;

a memory for storing a set of form definition procedures for defining an electronic computer-based data entry form, responsive to user commands, said form definition procedures including an imaging procedure for displaying on said display at least a portion of said scanned data entry form;

a region definition procedure for enabling a user to indicate regions of said displayed data entry form; and object definition procedures for enabling said user to define a multiplicity of objects, said objects corresponding to ones of said regions and including form sections, text boxes, and checkbox buttons, and for specifying properties of said defined objects;

said specified properties including (A) links for linking selected ones of said defined objects to respective specified fields in said database, and (B) exclusionary relationships for specifying which of said objects cannot be selected by end users when specified others of said objects have previously been selected by said end users; and said object definition procedures storing in said definition data structure form definition data corresponding to said user defined objects and user specified object properties; and a data processing unit for executing said stored form definition procedures;

wherein said electronic computer based data entry form is suitable for repeated use for specifying data to be stored in said database;

said form definition procedures including:

color recognition procedures for utilizing said color information, said color recognition procedures automatically defining ones of said objects and specifying ones of said properties of said objects based on said color information, including:

for each region of said digitized representation of said data entry form enclosed by a colored border of a first predefined color, automatically defining a form section having physical dimensions corresponding to the position of said color border in said digitized representation of said data entry form;

for each region of said digitized representation of said data entry form highlighted with a second predefined color, automatically defining a checkbox button object having physical dimensions corresponding to the extent of said highlighted region in said digitized representation of said data entry form; and for each region of said digitized representation of said data entry form highlighted with a third predefined color, automatically defining a text box object having physical dimensions corresponding to the extent of said highlighted region in said digitized representation of said data entry form;

said color recognition procedures storing in said definition data structure form definition data corresponding to said automatically defined objects.

2. The system of claim 1, said color recognition procedures including a text label definition procedure, invoked automatically when defining an object corresponding to a region of said scanned data entry form demarcated by a predefined color, for performing image to text conversion in said demarcated region so as to generate a text label for said automatically defined object; and said electronic computer based data entry form generated by said form definition procedures including at least a portion of said digitized representation of said paper based data entry form.

3. A system for facilitating the conversion of paper based data entry forms to fully reusable, voice activated electronic computer based data entry forms for specifying data to be stored in a database; said database storing data in records each having a plurality of fields, said system comprising:

a scanner for scanning an existing data entry form and for generating a digitized representation of said data entry form; said digitized representation including color information;

a display for displaying images;

a form definition data structure for storing data representing said scanned data entry form;

a microphone for receiving voiced commands and form item selections;

a memory for storing a set of form definition procedures for defining an electronic computer-based data entry form, responsive to user commands, said form definition procedures including an imaging procedure for displaying on said display at least a portion of said scanned data entry form;

a region definition procedure for enabling a user to indicate regions of said displayed data entry form; and object definition procedures for enabling said user to define a multiplicity of objects, said objects corresponding to ones of said regions and including form sections, text boxes, and checkbox buttons, and for specifying properties of said defined objects;

said specified properties including (A) links for linking selected ones of said defined objects to respective specified fields in said database, (B) exclusionary relationships for specifying which of said objects cannot be selected by end users when specified others of said objects have previously been selected by said end users, and (C) voiced command data specifying voiced commands to use for end user voiced selection of said objects; and said object definition procedures storing in said definition data structure form definition data corresponding to said user defined objects and user specified object properties; and a data processing unit for executing said stored form definition procedures;

wherein said electronic computer based data entry form is suitable for repeated use for specifying data to be stored in said database;

said form definition procedures including:

color recognition procedures for utilizing said color information, said color recognition procedures automatically defining ones of said objects and specifying ones of said properties of said objects based on said color information, including:

for each region of said digitized representation of said data entry form enclosed by a colored border of a first predefined color, automatically defining a form section having physical dimensions corresponding to the position of said color border in said digitized representation of said data entry form;

for each region of said digitized representation of said data entry form highlighted with a second predefined color, automatically defining a checkbox button object having physical dimensions corresponding to the extent of said highlighted region in said digitized representation of said data entry form; and for each region of said digitized representation of said data entry form highlighted with a third predefined color, automatically defining a text box object having physical dimensions corresponding to the extent of said highlighted region in said digitized representation of said data entry form;

said color recognition procedures storing in said definition data structure form definition data corresponding to said automatically defined objects.

4. The system of claim 3, said color recognition procedures including a text label definition procedure, invoked automatically when defining an object corresponding to a region of said scanned data entry form demarcated by a predefined color, for performing image to text conversion in said demarcated region so as to generate a text label for said automatically defined object; and said electronic computer based data entry form generated by said form definition procedures including at least a portion of said digitized representation of said paper based data entry form.

5. A system for facilitating the conversion of paper based data entry forms to fully reusable, voice activated electronic computer based data entry forms for specifying data to be stored in a database, said database storing data in records each having a plurality of fields, said system comprising:

a scanner for scanning an existing data entry form and for generating a digitized representation of said data entry form;

a display for displaying images;

a form definition data structure for storing data representing said scanned data entry form;

a microphone for receiving voiced commands and form item selections;

a memory for storing a set of form definition procedures for defining an electronic computer-based data entry form, responsive to user commands, said form definition procedures including an imaging procedure for displaying on said display at least a portion of said scanned data entry form;

a region definition procedure for enabling a user to indicate regions of said displayed data entry form; and object definition procedures for enabling said user to define a multiplicity of objects, said objects corresponding to ones of said regions and including form sections, text boxes, and checkbox buttons, and for specifying properties of said defined objects;

said specified properties including (A) links for linking selected ones of said defined objects to respective specified fields in said database, (B) exclusionary relationships for specifying which of said objects cannot be selected by end users when specified others of said objects have previously been selected by said end users, and (C) voiced command data specifying voiced commands to use for end user voiced selection of said objects; and said object definition procedures storing in said definition data structure form definition data corresponding to said user defined objects and user specified object properties; and a data processing unit for executing said stored form definition procedures;

wherein said electronic computer based data entry form is suitable for repeated use for specifying data to be stored in said database;

said form data entry procedures including a voice response procedure for responding to each voice input by an end user by determining which section, if any, of said computerized entry form was last selected by said end user and finding a best match, if any, between said voice input and said specified voiced commands corresponding to said defined objects in said selected form section.

6. A method of facilitating the conversion of paper based data entry forms to fully reusable electronic computer based data entry forms for specifying data to be stored in a database, said database storing data in records each having a plurality of fields, said method comprising, comprising:

scanning an existing data entry form so as to generate a digitized representation of said data entry form, and storing said digitized representation of said data entry form in a computer memory; said digitized representation including color information;

displaying on a display at least a portion of said scanned data entry form;

storing in said computer memory a form definition data structure, said form definition data structure for storing data representing said scanned data entry form;

receiving user commands indicating regions of said displayed data entry form, and storing in said form data structure data representing said indicated regions; and receiving user commands defining a multiplicity of objects, and specifying properties of said defined objects; said objects corresponding to ones of said regions and including form sections, text boxes, and checkbox buttons, said specified properties including (A) links for linking selected ones of said defined objects to respective specified fields in said database, and (B) exclusionary relationships for specifying which of said objects cannot be selected by end users when specified others of said objects have previously been selected by said end users; and storing in said form data structure data corresponding to said user defined objects and user specified object properties;

wherein said electronic computer based data entry form is suitable for repeated use for specifying data to be stored in said database;

said method further including:

after said scanning step, automatically defining ones of said objects and specifying ones of said properties of said objects based on said color information, including:

for each region of said digitized representation of said data entry form enclosed by a colored border of a first predefined color, automatically defining a form section having physical dimensions corresponding to the position of said color border in said digitized representation of said data entry form;

for each region of said digitized representation of said data entry form highlighted with a second predefined color, automatically defining a checkbox button object having physical dimensions corresponding to the extent of said highlighted region in said digitized representation of said data entry form; and for each region of said digitized representation of said data entry form highlighted with a third predefined color, automatically defining a text box object having physical dimensions corresponding to the extent of said highlighted region in said digitized representation of said data entry form; and storing in said definition data structure form definition data corresponding to said automatically defined objects.

7. The method of claim 6, including:

automatically defining an object corresponding to a region of said scanned data entry form demarcated by a predefined color, for performing image to text conversion in said demarcated region so as to generate a text label for said automatically defined object; and said electronic computer based data entry form generated by said form definition procedures including at least a portion of said digitized representation of said paper based data entry form.

8. A method of facilitating the conversion of paper based data entry forms to fully reusable electronic computer based data entry forms for specifying data to be stored in a database, said database storing data in records each having a plurality of fields, said method comprising, comprising:

scanning an existing data entry form so as to generate a digitized representation of said data entry form, and storing said digitized representation of said data entry form in a computer memory;

displaying on a display at least a portion of said scanned data entry form;

storing in said computer memory a form definition data structure, said form definition data structure for storing data representing said scanned data entry form;

receiving user commands indicating regions of said displayed data entry form, and storing in said form data structure data representing said indicated regions; and receiving user commands defining a multiplicity of objects, and specifying properties of said defined objects; said objects corresponding to ones of said regions and including form sections, text boxes, and checkbox buttons, said specified properties including (A) links for linking selected ones of said defined objects to respective specified fields in said database, and (B) exclusionary relationships for specifying which of said objects cannot be selected by end users when specified others of said objects have previously been selected by said end users; and storing in said form data structure data corresponding to said user defined objects and user specified object properties;

wherein said electronic computer based data entry form is suitable for repeated use for specifying data to be stored in said database;

said step of receiving user commands defining a multiplicity of objects, and specifying properties of said defined objects further including receiving user commands specifying voiced commands for end user voiced selection of said objects;

said method including:

generating a voice dictionary, representing voice recognition information associated with said specified voiced commands;

receiving voiced commands from said end user; and responding to each voiced command by determining which section, if any, of said computerized entry form was last selected by said end user and finding a best match, if any, between said voice input and said specified voiced commands corresponding to said defined objects in said selected form section.

9. A system for facilitating the conversion of paper based data entry forms to fully reusable electronic computer based data entry forms for specifying data to be stored in a database, said database storing data in records each having a plurality of fields, said system comprising:

a scanner for scanning an existing data entry form and for generating a digitized representation of said data entry form; said digitized representation including color information;

a display for displaying images;

a form definition data structure for storing data representing said scanned data entry form;

a memory for storing a set of form definition procedures for defining an electronic computer-based data entry form, responsive to user commands, said form definition procedures including an imaging procedure for displaying on said display at least a portion of said scanned data entry form;

a region definition procedure for enabling a user to indicate regions of said displayed data entry form; and object definition procedures for enabling said user to define a multiplicity of objects, said objects corresponding to ones of said regions and including form sections, text boxes; and checkbox buttons, and for specifying properties of said defined objects;

said specified properties including (A) links for linking selected ones of said defined objects to respective specified fields in said database; and (B) exclusionary relationships for specifying which of said objects cannot be selected by end users when specified others of said objects have previously been selected by said end users; and said object definition procedures storing in said definition data structure form definition data corresponding to said user defined objects and user specified object properties; and a data processing unit for executing said stored form definition procedures;

wherein said electronic computer based data entry form is suitable for repeated use for specifying data to be stored in said database;

said form definition procedures including:

color recognition procedures for utilizing said color information, said color recognition procedures automatically defining ones of said objects to correspond to color demarcated regions of said scanned data entry form and specifying ones of said properties of said objects based on said color information.

10. The system of claim 9, said color recognition procedures including a text label definition procedure, invoked automatically when defining an object corresponding to a region of said scanned data entry form demarcated by a predefined color, for performing image to text conversion in said demarcated region so as to generate a text label for said automatically defined object; and said electronic computer based data entry form generated by said form definition procedures including at least a portion of said digitized representation of said paper based data entry form.

11. A method of facilitating the conversion of paper based data entry forms to fully reusable electronic computer based data entry forms for specifying data to be stored in a database, said database storing data in records each having a plurality of fields, said method comprising, comprising:

scanning an existing data entry form so as to generate a digitized representation of said data entry form, and storing said digitized representation of said data entry form in a computer memory, said digitized representation including color information;

displaying on a display at least a portion of said scanned data entry form;

storing in said computer memory a form definition data structure, said form definition data structure for storing data representing said scanned data entry form;

receiving user commands indicating regions of said displayed data entry form, and storing in said form data structure data representing said indicated regions; and receiving user commands defining a multiplicity of objects, and specifying properties of said defined objects; said objects corresponding to ones of said regions and including form sections, text boxes, and checkbox buttons, said specified properties including (A) links for linking selected ones of said defined objects to respective specified fields in said database, and (B) exclusionary relationships for specifying which of said objects cannot be selected by end users when specified others of said objects have previously been selected by said end users; and storing in said form data structure data corresponding to said user defined objects and user specified object properties;

wherein said electronic computer based data entry form is suitable for repeated use for specifying data to be stored in said database;

said method including:

automatically defining ones of said objects to correspond to color demarcated regions of said scanned data entry form and specifying ones of said properties of said objects based on said color information.

12. The method of claim 11, automatically, when defining an object corresponding to a region of said scanned data entry form demarcated by a predefined color, performing image to text conversion in said demarcated region so as to generate a text label for said automatically defined object; and said electronic computer based data entry form generated by said form definition procedures including at least a portion of said digitized representation of said paper based data entry form.

* * * * *